United States Patent [19]

Bohrer et al.

[11] Patent Number: 4,548,078
[45] Date of Patent: Oct. 22, 1985

[54] INTEGRAL FLOW SENSOR AND CHANNEL ASSEMBLY

[75] Inventors: Philip J. Bohrer, Minneapolis; Robert E. Higashi, Bloomington; Robert G. Johnson, Minnetonka, all of Minn.

[73] Assignee: Honeywell Inc., Minneapolis, Minn.

[21] Appl. No.: 634,088

[22] Filed: Jul. 25, 1984

Related U.S. Application Data

[63] Continuation-in-part of Ser. No. 429,598, Sep. 30, 1982, Pat. No. 4,501,144.

[51] Int. Cl.[4] .............................................. G01F 1/68
[52] U.S. Cl. ...................................... 73/204; 357/55
[58] Field of Search ................. 73/204; 361/385, 403; 337/55

[56] References Cited

U.S. PATENT DOCUMENTS

| | | |
|---|---|---|
| 2,650,496 | 9/1953 | Middleton et al. |
| 2,709,365 | 5/1955 | Piety |
| 2,831,351 | 4/1958 | Jacobson |
| 3,114,261 | 12/1963 | Dillon et al. |
| 3,258,898 | 7/1966 | Garibotti |
| 3,869,787 | 3/1975 | Umbaugh |
| 3,988,928 | 11/1976 | Edstrom et al. ......... 73/204 |
| 3,992,940 | 11/1976 | Platzer, Jr. ............. 73/204 |
| 3,996,799 | 12/1976 | Van Putten ............. 73/204 |
| 4,222,277 | 9/1980 | Kurtz |
| 4,258,381 | 3/1981 | Inaha |
| 4,298,855 | 11/1981 | Mills |
| 4,299,130 | 11/1981 | Koneval |
| 4,320,655 | 3/1982 | Kammermaier |
| 4,471,647 | 9/1984 | Jerman ................. 73/23.1 |

OTHER PUBLICATIONS

Angell et al., "Silicon Micromechanical Devices".
Malin et al., "Mass Flow Meter" in IBM Tech. Disclosure Bulletin, vol. 21, #8, 1979.
Solid-State Flow-Thru Pressure Sensors 150 PC Series, Micro Switch, Honeywell.

Primary Examiner—Herbert Goldstein
Attorney, Agent, or Firm—John P. Sumner

[57] ABSTRACT

Disclosed is an integral flow sensor and channel assembly comprising a flow sensor having a sensing element integral to a semiconductor body. The assembly further comprises support structure for supporting the flow sensor, the support structure having a first surface. An enclosed flow channel comprises the first surface formed into a groove running below the sensing element. The flow channel comprises an inlet and an outlet for providing flow across the sensing element. The sensing element is located in the flow channel between the inlet and the outlet. The support structure comprises apparatus for flip-chip mounting the semiconductor body, and the semiconductor body is flip-chip mounted so that the sensing element is positioned over the groove in the support structure.

22 Claims, 11 Drawing Figures

INTEGRAL FLOW SENSOR AND CHANNEL ASSEMBLY

This application is a continuation-in-part application of application Ser. No. 429,598, filed 09/30/82, now U.S. Pat. No. 4,501,144.

BACKGROUND AND SUMMARY OF THE INVENTION

Many applications of miniature flow sensors require that the flow of air or gas be directed across the sensor in a well-controlled manner. Minature flow sensors can also be practically applied to measuring differential pressure if they are properly packaged in an appropriate housing.

For practical differential pressure application, the rate of flow through the sensor housing should be regulated to low levels to allow effective use of reasonable filters. Effective filtering is required to remove particulates from the gas to prevent particulate accumulation on the sensor. A lower rate of flow through the housing results in a lower amount of airborne particulates entering the housing and results in less loading of the filter and longer maintenance-free use. Also, high flow impedence facilitates a broader base of practical differential pressure applications as the lower flow rates are more tolerable.

It is also preferred that a practical sensor housing for miniature flow sensors be configured so that the gas flow rate or velocity profile at the active sensing area of the miniature sensor is stable and independent of the flow velocity profile outside the housing. That is, the flow profile at the sensor should be substantially fully developed and substantially independent of the flow profile upstream of the housing inlet.

Miniature flow sensors also require circuitry and electrical connections to circuitry to drive, read-out, signal condition the sensor response, or otherwise operate the sensor.

The present invention provides an integral flow sensor and channel assembly capable of satisfying these requirements. Further, the present invention is capable of satisfying these requirements without the need for secondary packaging to carry the sensor or circuitry. Prior housings involved bonding a minature sensor to a first-level package and electrically connecting the first-level package to a second-level package which supports the associated electronic circuitry. The present invention eliminates the need for the first-level package and, at the same time, provides means for meeting the flow control requirements mentioned above.

The present invention is an integral flow sensor and channel assembly comprising a flow sensor having a sensing element integral to a semiconductor body. The assembly further comprises support structure for supporting the flow sensor, the support structure having a first surface. An enclosed flow channel comprises the first surface formed into a groove running below the sensing element. The flow channel comprises an inlet and an outlet for providing flow across the sensing element. The sensing element is located in the flow channel between the inlet and the outlet. The support structure comprises apparatus for flip-chip mounting the semiconductor body, and the semiconductor body is flip-chip mounted so that the sensing element is positioned over the groove in the support structure.

DETAILED DESCRIPTION OF THE PREFERRED EMBODIMENTS

Figure 1:
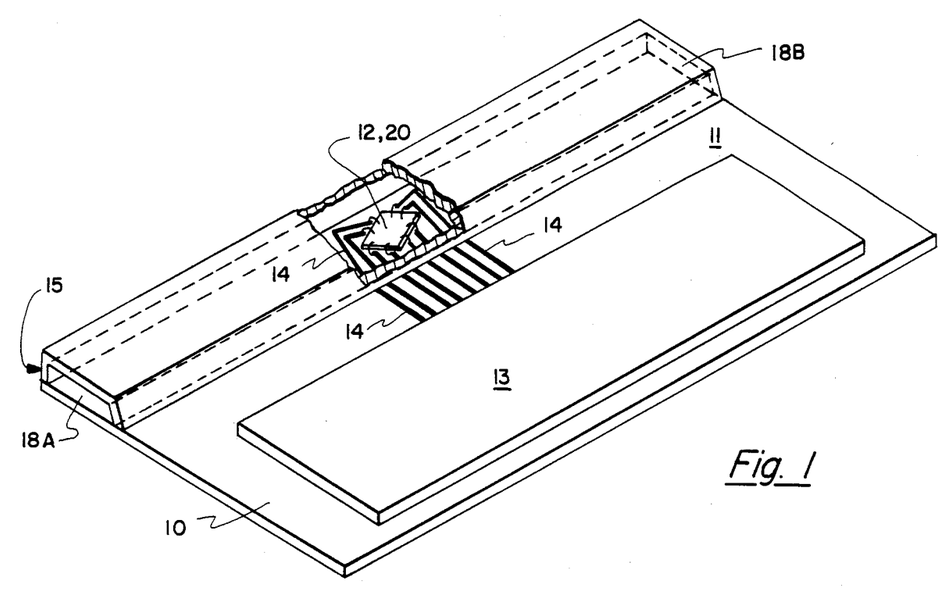
FIGS. 1, 2, 2A, 3 and 3A illustrate alternate preferred embodiments of the present invention.

FIG. 1 illustrates a flow sensor 12 having sensing elements 22 and 24 (see FIG. 4) and support means 10 for supporting the flow sensor. An executed flow channel 19 is formed at least in part by support means 10. Flow channel 19 has an inlet 18A and an outlet 18B for providing flow across sensing elements 22 and 24. Sensing elements 22 and 24 are located in the enclosed flow channel between inlet 18A and outlet 18B. Circuitry 13 for operating the sensor (see FIG. 9), flow sensor 12, enclosed flow channel 19, and electrical connections 14 between the sensor and circuit, are all integral to the support means 10.

Flow channel 19 is preferrably configured to provide at sensing elements 22 and 24 a substantially fully developed flow profile which is substantially independent of a flow profile entering inlet 18A. A miniature flow sensor such as disclosed can respond only to the flow rate at the immediate vicinity of its active sensing area. A change in the flow profile at the sensor will cause a change in sensor response even if the rate of flow through the channel is the same. That is, a sensor can respond to both changes in flow rate and to changes in flow profile, and miniature sensors such as disclosed are particularly sensitive to changes in both flow rate and flow profile. Therefore, in order to realize reliable flow rate and differential pressure measurements, the flow profile in the channel at the sensor should be controlled in order to avoid erroneous sensor response.

Flow profile stability can be realized by making the enclosed flow channel between inlet 18A and sensor 12 sufficiently long and continuous such that the flow is substantially fully developed at the sensor region of the channel.

Figure 2:
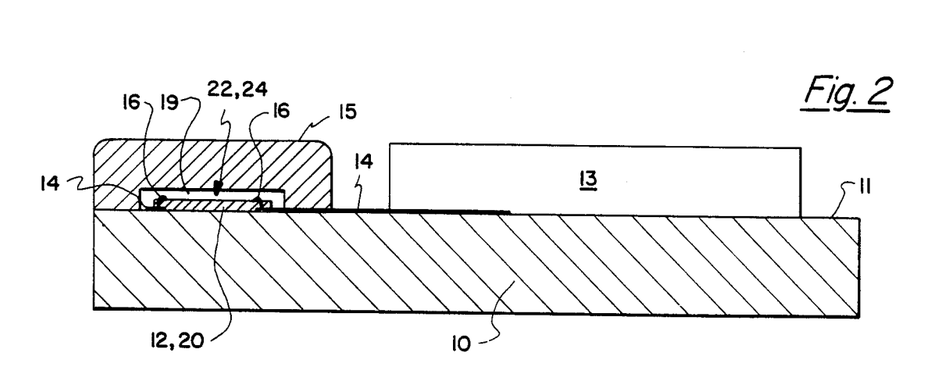
Figure 2A:
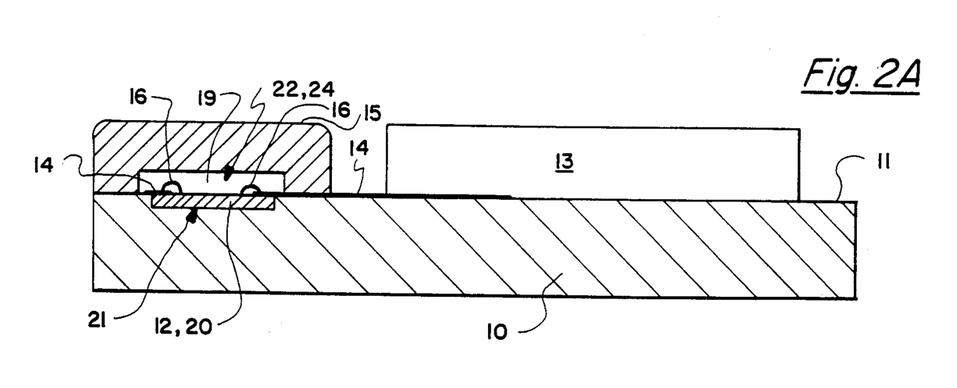

The embodiments illustrated in FIGS. 1, 2 and 2A utilize a relatively shallow flow channel 19 which provides a substantially fully developed flow profile at the sensor without requiring impractical channel lengths. A flow channel having a length of 1 inch between inlet 18A and sensor 12, a height of 0.02 inch, and a width of 0.1 inch is exemplary of such a configuration (as further discussed below, other dimensions and configurations are also possible).

The embodiment illustrated in FIGS. 1 and 2 illustrates flow sensor 12 integral to a semiconductor body 20 with semiconductor body 20 bonded to first surface 11 of support piece 10. In this embodiment, therefore, sensing elements 22 and 24 are not in the same plane as first surface 11; i.e., when the flow profile reaches sensor 12, it is disturbed by the sensor i.e. by semiconductor body 20. Nevertheless, it has been found that, if flow channel 19 is configured to provide at the sensor a substantially fully developed flow profile which is substantially independent of a flow profile entering inlet 18A, the perturbation caused by the nominal 0.008–0.010 inch thick semiconductor body 20 does not cause inconsistant results, even though this thickness of semiconductor body is a significant portion of a nominal 0.02 inch height of channel 19 illustrated.

Placing sensor 12 an adequate distance from both inlet 18A and outlet 18B as illustrated in FIG. 1 provides the option of using the housing for flow in either direction, i.e., by reversing the inlet and outlet, while still preserving the capability to obtain a substantially fully developed flow profile which is substantially independent of a flow profile entering either end of the channel. If such a bidirectional characteristic is not desired, the distance between sensor 12 and outlet 18B can be substantially shortened, thereby making the overall device smaller. In other words, for applications where flow measurements are to be made in one direction only (for flow from inlet 18A to outlet 18B), the distance between sensor 12 and outlet 18B is not of particular importance in obtaining a substantially fully developed profile and in obtaining consistent readings of the sensor.

The embodiment illustrated in FIG. 2A utilizes a recess 21 for semiconductor body 20; in the embodiment illustrated, recess 21 results in sensing elements 22 and 24 being substantially in the same plane as first surface 11. While as explained above such an embodiment is not necessary to obtain consistent results, there may be advantages in some instances to using such a configuration. For example, maximum sensor response for the sensor disclosed is obtained by orienting the air flow in a direction substantially perpendicular to the edges, e.g., edges 80 and 88, of sensors 22 and 24. If the orientation of the flow sensor is changed, a varying output will result.

Therefore, for housings in accordance with the present invention, it may be of advantage to employ means for orienting the flow sensor for a desired or optimum response to the flow. One example of such a means for orienting the flow sensor is recess 21 illustrated in FIG. 2A. Another example illustrated in the present application results from the flip-chip mounting techniques employed in the embodiment illustrated in FIGS. 3 and 3A where by pads 90 on the sensor (see FIG. 4) and corresponding pads on first surface 11 may be located to provide a preferred orientation.

Figure 3:
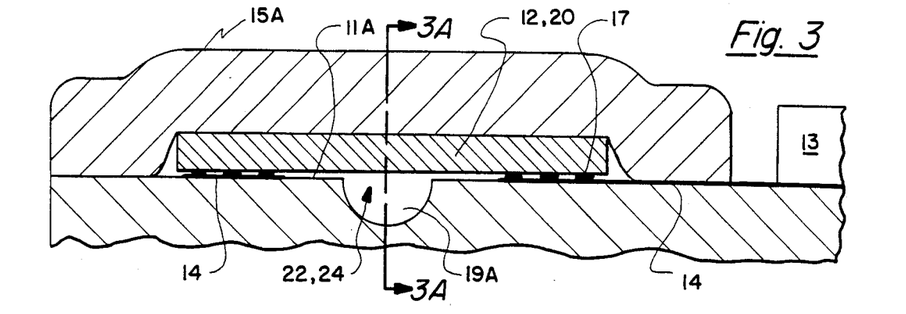
Figure 3A:
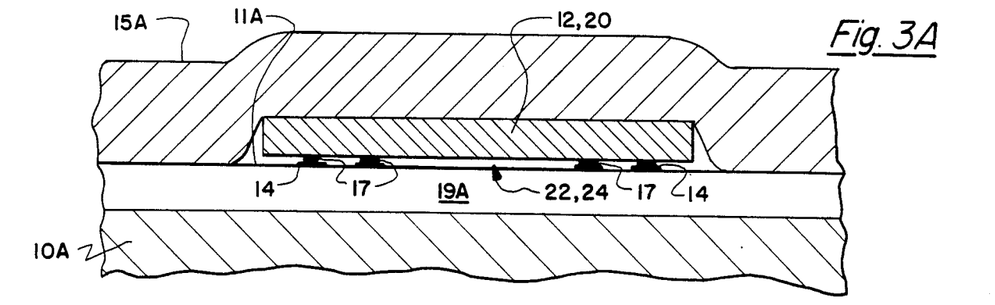

The embodiment illustrated in FIGS. 3 and 3A utilizes a channel 19A of substantially semicircular configuration which may be etched into support piece 10A or otherwise formed as desired. Such a channel having a cross-sectional radius of approximately 0.01 inch and a length of approximately 0.4 inch between the inlet and the sensor is satisfactory to achieve substantially fully developed flow at the sensor.

In embodiments such as those disclosed, whether the cross-sectional configuration is rectangular as shown in FIG. 1, substantially semicircular as shown in FIG. 3, or is of some other shape such as square or round is of relatively little concern. What is of significance is providing at the sensor a substantially fully developed flow profile which is substantially independent of a flow profile entering the inlet. In order for this to be accomplished, there must be a sufficiently large aspect ratio (e.g. the ratio of height or width or cross-sectional area to length) for the channel length between inlet 18A and sensor 12.

An enclosed flow channel such as disclosed also provides relatively high flow impedance which limits/regulates the rate of flow through the housing to levels that allow for convenient effective filtering of particulates due to the inherent limitation of particulates entering the housing. Also, as the cross-sectional area at an upstream filter (not shown) is most likely considerably larger than that of the channel, the velocity at the filter will be considerably lower than the velocity at the sensor. The low velocity at such a filter allows for highly efficient filtration.

An alternate preferred embodiment of the present invention is illustrated in FIGS. 3 and 3A. Shown are a flow sensor 12 having sensing elements 22 and 24 integral to semiconductor body 20 and support means 10A having a first surface 11A. An enclosed flow channel 19A is comprised of first surface 11A formed into a groove running below sensing elements 22 and 24, flow channel 19A comprising an inlet and an outlet for providing flow across sensing elements 22 and 24. Support means 10A comprises means for flip-chip mounting semiconductor body 20, and the semiconductor body is flip-chip mounted so that sensing elements 22 and 24 are positioned over groove 19A in the support means. It is preferred that the width of groove 19A be greater than the length of elements 22 and 24. Also illustrated is circuitry 13 for generating the sensor and electrical connections 14 for connecting the sensor and circuitry. Flow channel 19A, sensor 12, circuitry 13, and electrical connections 14 are all integral to support means 10A.

The flip-chip mounting is accomplished as illustrated in FIG. 3 with solder bumps 17 well known in the art (or, as an alternate to solder, bumps 17 may be comprised of a noble metal to reduce corrosion in corrosive environments).

In the embodiments illustrated, circuitry 13 may be connected to flow sensor 12 using thin film (or thick film) metalization interconnects 14 between the circuitry and wire bonds 16 (FIGS. 2 and 2A) or bumps 17 (FIGS. 3 and 3A). Such metalization interconnects and the associated wire bond or flip-chip electrical connection techniques are well known in the art. Metalization interconnects 14 are advantageous to maintaining an enclosed flow channel which is sealed at all locations other than at inlet 18A and outlet 18B since covers 15 or 15A used in forming the enclosed flow channel can be readily bonded to first surfaces 11 and 11A over thin film metalization interconnects 14 in order to maintain a seal along the entire interface.

Figure 4:
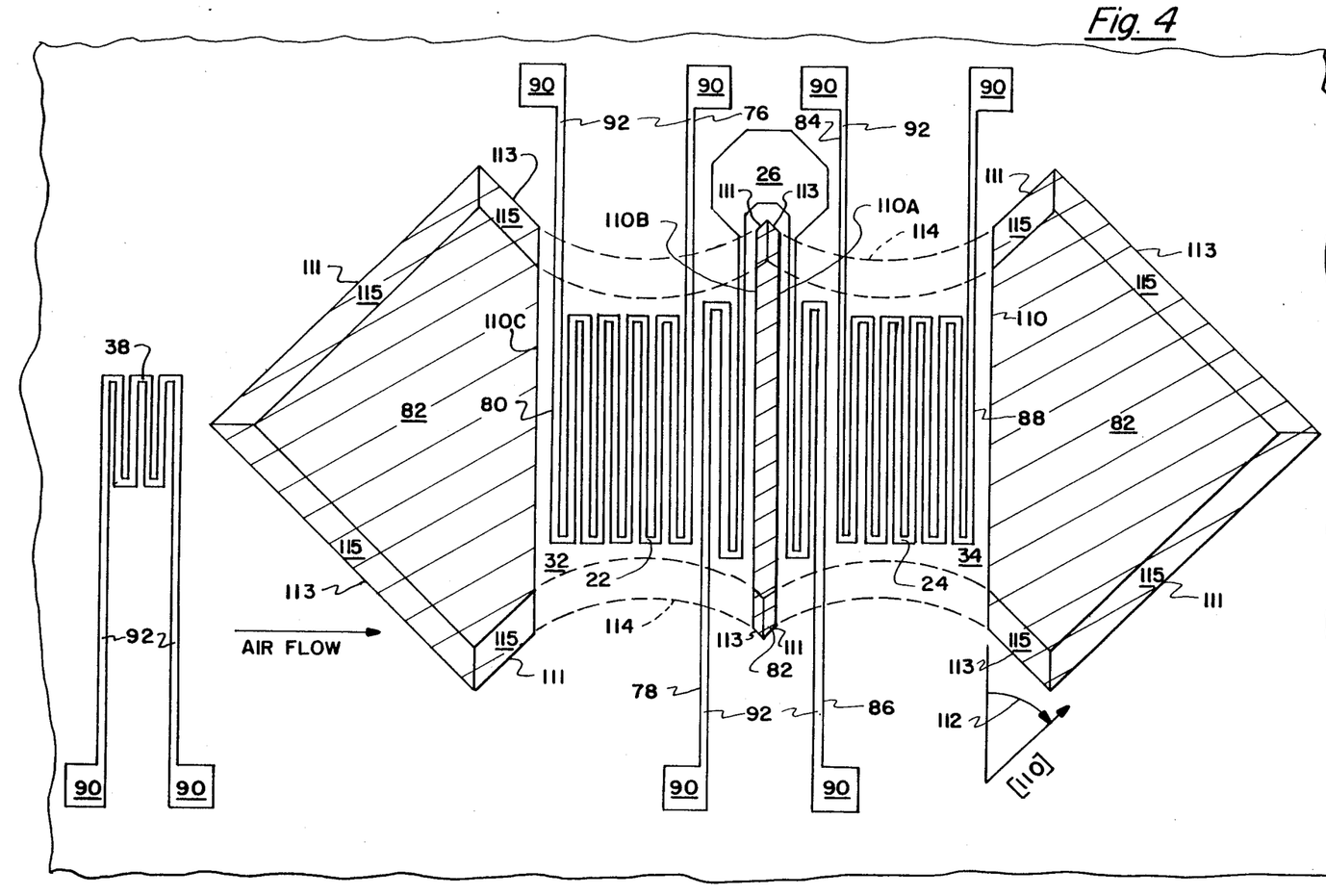
FIGS. 4–8 illustrate the preferred embodiment of a flow sensor compatible with the present invention.

The preferred embodiment of the flow sensor comprising the present invention includes a pair of thin film heat sensors 22 and 24, a thin film heater 26, and a base 20 supporting the sensors and heater out of contact with the base. Sensors 22 and 24 are disposed on opposite sides of heater 26.

Body 20 is preferably a semiconductor body and preferably silicon, chosen because of its adaptability to precision etching techniques and ease of electronic chip producibility. The sensor preferrably includes two identical temperature sensing resistor grids 22 and 24 acting as the thin film heat sensors and further includes a centrally located heater resistor grid 26 acting as the thin film heater. Sensors 22 and 24 and heater 26 are preferrably fabricated of nickel-iron, herein sometimes referred to as permalloy, having a preferred composition of 80% nickel and 20% iron. The sensor and heater grids are encapsulated in a thin film of dielectric, typically comprising layers 28 and 29 and preferrably silicon nitride, to form thin film members. In the embodiment shown in FIG. 4, the sensor comprises two thin film members 32 and 34, member 32 comprising sensor 22 and member 34 comprising sensor 24, each member comprising one-half of heater 26.

The preferred embodiment the disclosed sensor further comprises an accurately defined air space which results in an air space effectively surrounding elements 22, 24, and 26. The effectively surrounding air space is achieved by fabricating the structure on silicon surface 36, thin film elements 22, 24, and 26 preferrably being encapsulated in thin film silicon nitride film, and by subsequently etching an accurately defined air space into silicon body 20 beneath members 32 and 34.

Figure 6:
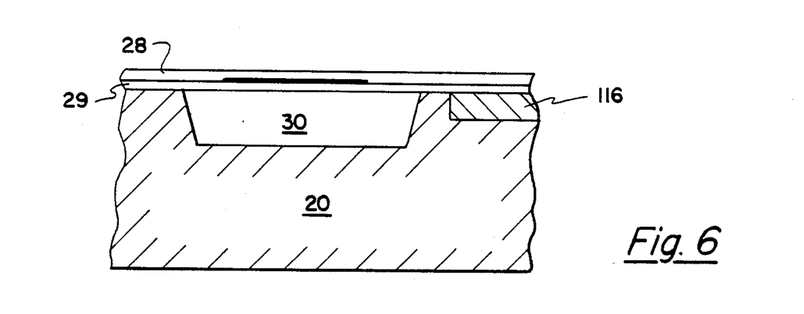

Members 32 and 34 connect to top surface 36 of semiconductor body 20 at one or more edges of depression or air space 30. As illustrated in FIG. 6, members 32 and 34 may be bridged across depression 30. Other configurations are possible. For example, members 32 and 34 may be cantilevered over depression 30.

The operation of the present sensor in sensing air flow can be described with reference to FIG. 4. Heater resistor grid 26 operates at a preferred constant average temperature difference of 100-200 degrees centigrade elevated above the temperature of silicon chip 20 which temperature is not appreciably different from the ambient air stream temperature. The power required by heater resistor 26 to achieve 200 degrees centigrade above ambient temperature is very small, being on the order of 0.010 watt.

In the preferred embodiment at zero airflow velocity, thermal conduction from heater resistor grid 26, largely through surrounding air space including air space 30, heats identical temperature sensing resistor grids 22 and 24 to an average temperature of about 60-70% of the temperature elevation of heater element 26. In the preferred embodiment illustrated, sensor grids 22 and 24 are precisely symmetrically located with respect to heater grid 26 so that at zero airflow they have identical temperatures and have no differences between their resistances. Consequently, a small probe current, 0.1-1.0 milli-amperes preferred, through both sensor resistances 22 and 24 will develop no voltage difference at zero airflow velocity.

With airflow present, upstream resistors sensor 22 will be cooled by the transportation of heat away from sensor 22 toward heater resistor grid 26, whereas downstream sensor 24 will be heated by a transportation of heat toward the sensor from heat resistor grid 26. Consequently, a resistance difference between sensor resistances 22 and 24 will be present with a corresponding difference in voltage drop which is a measure of the air flow. Typical unamplified voltage differences can be as high as 0.1 volt at a 1500 feet/minute flow velocity.

In the preferred operation of the present sensor, sensors 22 and 24 are operated with constant current such that temperature field changes can be sensed under flow conditions as previously described. Other operating arrangements are also possible.

Because of the exceedingly small thermal mass of the heater and sensor element structure and the thermal insulation provided by the thin silicon nitride connecting means to the supporting silicon body, and because of the surrounding air space, response time of the present sensor is very short, with response time constants of 0.005 seconds having been measured. Consequently, sensor elements 22 and 24 can respond very rapidly to air flow changes.

In the preferred embodiment of the present sensor, ambient temperature is monitored by a reference resistor 38 which is heat sunk onto semiconductor body 20.

Resistor 38 may be a permalloy grid formed substantially like grids 22, 24 and 26 and is typically encapsulated in dielectric layers 28 and 29 and mounted on surface 36.

The typical 0.8 micron total thickness of dielectric layers 28 and 29 is very thin and, accordingly, permits relatively good heat conduction and transfer perpendicular to the layers to and from resistive grids 22, 24, 26 and 38. Thus, reference resistor 38, being attached by the encapsulating dielectric directly to surface 36 of semiconductor body 20, readily monitors the temperature of the semiconductor body, which stays within 0.5 degrees centigrade of ambient temperature even with resistor grid 26 elevated to 200 degrees centigrade above ambient. Accordingly, heat sunk reference resistor 38 may be used to monitor ambient air flow temperature by monitoring a temperature that is very close to that of semiconductor body 20, which in turn is very close to ambient temperature.

Figure 9:
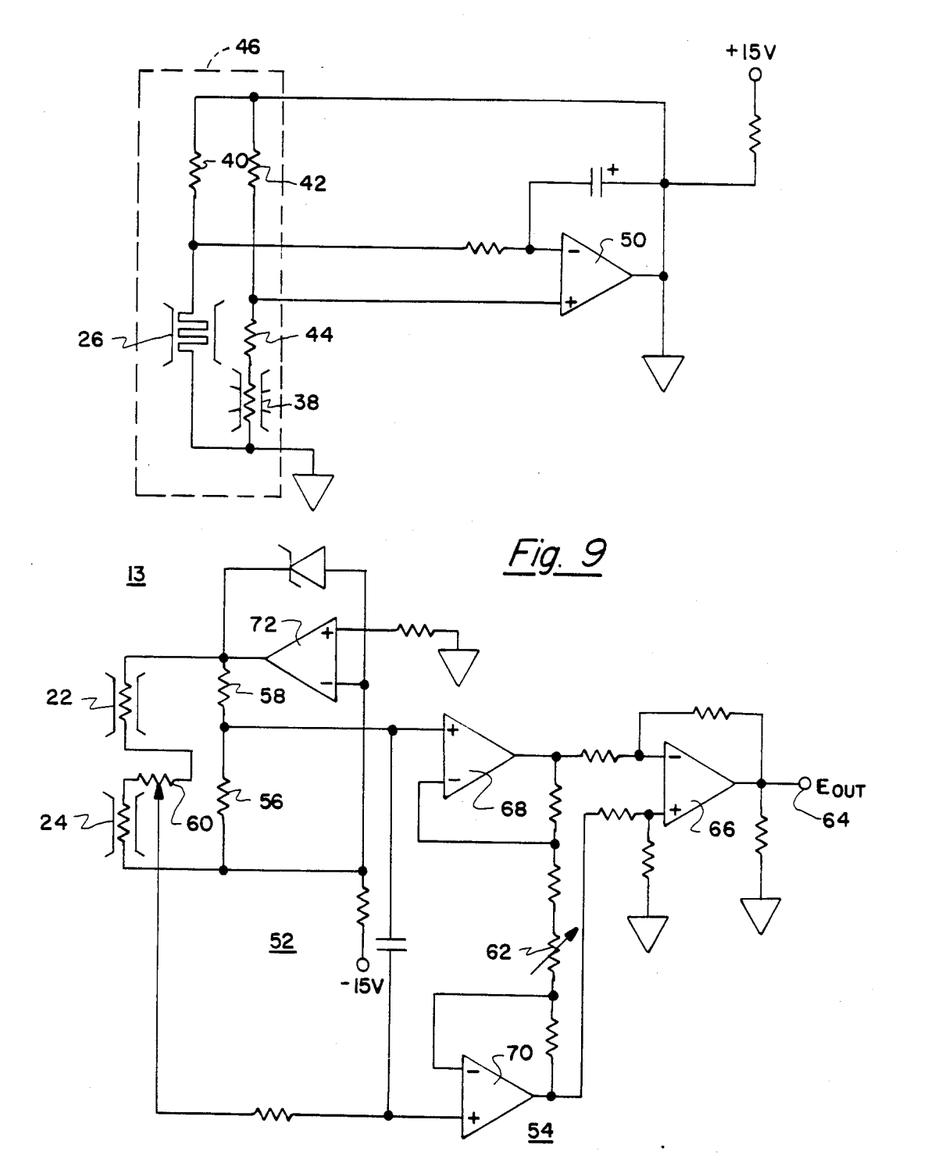
FIG. 9 illustrates circuitry for operating the disclosed sensor.

As previously indicated in the preferred operation of the present sensor, heater 26 is operated at a constant temperature above ambient temperature, sensors 22 and 24 being operated at constant current, and the changing temperatures of sensors 22 and 24 are sensed as changes in resistance. Circuits for accomplishing these functions are illustrated in FIG. 9. The smaller circuit controls the temperature of heater 26 while the larger circuit provides an output voltage that is proportional to the resistance difference between heat sensing resistors 22 and 24.

The heater control circuit illustrated in FIG. 9 uses a wheatstone bridge 46 to maintain heater 26 at a constant temperature rise above ambient as sensed by heat sunk reference resistor 38. Wheatstone bridge 46 is shown comprising heater resistor 26 and a resistor 40 in its first leg and a resistor 42, heat sunk resistor 38 and a resistor 44 in its second leg. An error integrator comprising amplifier 50 keeps bridge 46 balanced by varying the potential across it and thus the power dissipated in heater 26.

The circuity which monitors the resistance difference between downstream sensor 24 and upstream sensor 22 includes a constant current source 52 comprising an amplifier 72 and a differential amplifier 54 comprising amplifier 68 and 70. The constant current. source drives a wheatstone bridge comprising two high impedance resistors 56 and 58 in one leg and the two sensing resistors 22 and 24 with a nulling potentiometer 60 in the other leg. The gain of differential amplifier 54 is adjusted by potentiometer 62. Output 64 provides a voltage that is proportional to the resistance difference between the two sensing resistors 22 and 24.

Amplifiers 50, 66 and 72 may each comprise one-fourth of an LM324. Amplifiers 68 and 70 may each comprise one-half of an OP-10.

Circuitry 13 illustrated in FIG. 9 and integral to support means 10 or 10A may be part of the support piece as discrete components, hybrid circuits, thick film components, or other standard approaches to integrating circuitry within a support piece. Support means 10 or 10A may comprise any type of support compatible with circuitry. Examples include a printed circuit board, a ceramic substrate, or even a semiconductor substrate; support means 10 or 10A comprising a semiconductor substrate could, for example, be a substrate of silicon, and such a substrate could include solid state circuitry comprising all or part of circuitry 13.

Upstream sensor resistor 22 preferrably has an inner edge 76 in close proximity 5 to 10 microns, for example) to the near edge 78 of heater resistor grid 26. At such a separation from near edge 78 of heater resistor grid 26, the zero flow air temperature near heater resistor edge 78 is close to that of edge 78. In a typical embodiment, where sensors 22 and 24 have a width of approximately 100 microns, outer edge 80 of sensor resistor grid 22 is located approximately 100 microns from near edge 78 of heater resistor grid 26. At the 100 micron separation, the zero airflow temperature is closer to that of the ambient air stream and to that of silicon chip 20 than it is to the temperature of heater resistor 26.

Therefore, outer edge 80 of sensor resistor grid 22 is easily cooled to near the limiting temperature of silicon chip 20 by low velocity airflow. whereas the inner regions of sensor resistor grid 22 (near edge 76) are more tightly coupled thermally to heater resistor 26 and respond more readily to the higher airflow velocity before the limiting temperature of the ambient airstream is approached. Accordingly, the composite effect of the temperature change from each resistor grid line (lines spaced over the approximately 5-100 micron distance from heater edge 76) for an increment of airflow is to keep the corresponding increment on the upstream resistor temperature response curve more nearly constant over a broad airflow range.

As shown in FIG. 4, areas 82 are cut in the silicon nitride to facilitate etching as further described below. Overall geometry, including that of leads 92, is preferably made symmetrically to insure symmetrical heat conduction properties on members 32 and 34. Leads 92 connect to pad areas 90 for electrically connecting sensor elements 22, 24, 26, and 38 with circuitry 13 as previously discussed.

Elements 22 and 24 have a preferred resistance in one example of 1200 ohms and element 26 has a preferred resistance in that example of 520 ohms. In this embodiment, sensors 22 and 24 have a width of approximately 100 microns and a length of approximately 175 microns. As previously indicated, in this example the proximal edges of sensors 22 and 24 are one or two line widths (5-10 microns) away from heater 26. That is, edge 76 of sensor 22 is 5-10 microns away from edge 78 of heater 26, and edge 84 of sensor 24 is 5-10 microns away from edge 86 of heater 26.

As with other dimensions listed in the present application, the above dimensions are preferred dimensions which have been used in actual devices and are not deemed to be limiting, since these parameters could be substantially varied depending upon application.

Figure 5:
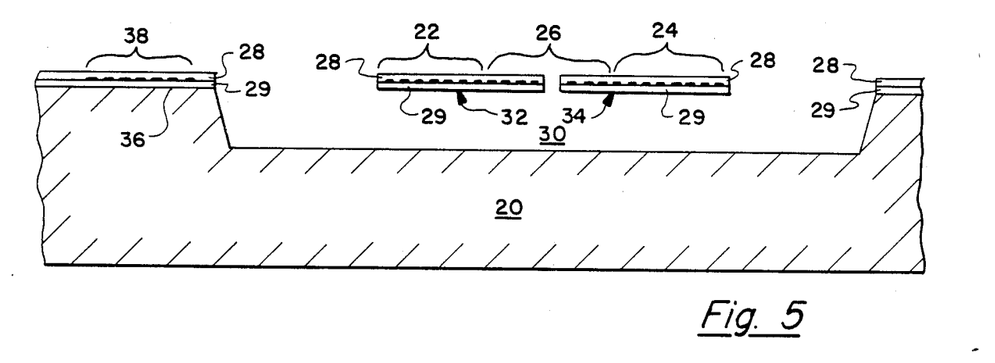
Figure 7:
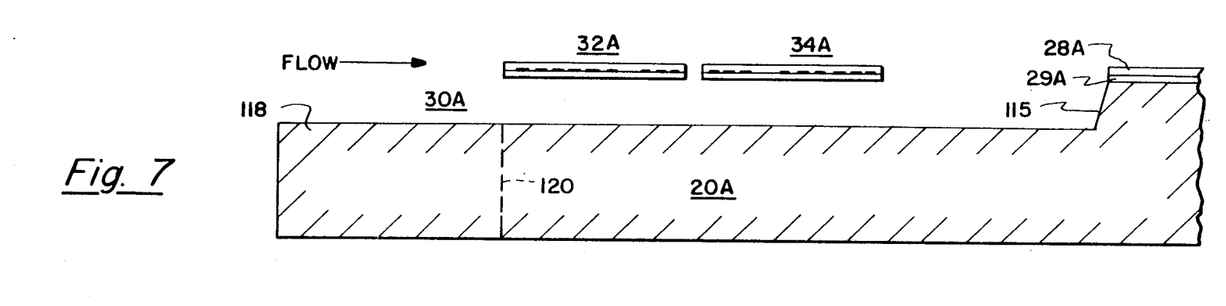
Figure 8:
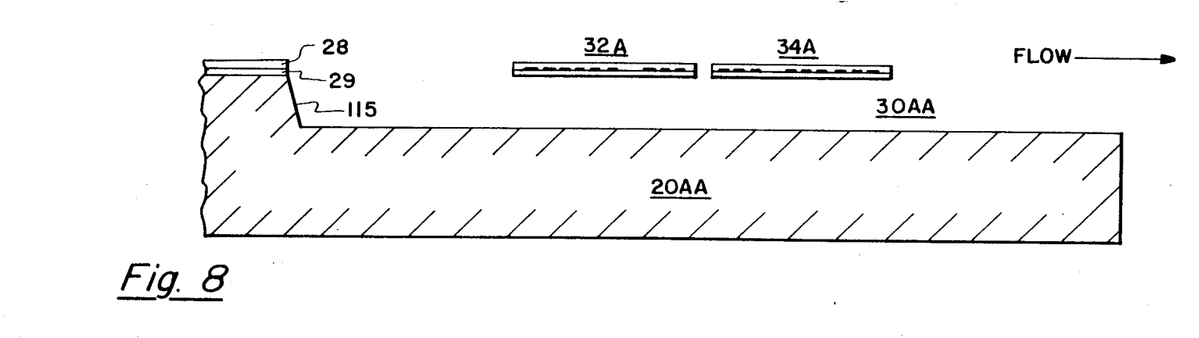

Sensing elements 22 and 24 may be located within the boundaries of a walled depression 30 as illustrated in FIG. 5. Alternately, elements 22 and 24 may be located at the edge of a chip or body so that either the upstream portion of a depression 30A is open to receive flow unimpeded by a sidewall, as shown in FIG. 7, or open at the downstream side so that flow may more easily exit, or be more easily drawn through, an air space 30AA as illustrated in FIG. 8. Note that the embodiment of FIG. 7 may be modified by removing at least a portion of the leading edge of body 20A, thus increasing the exposure of the leading edge of member 32A to flow; for example, portion 118 of body 20A may be removed back to line 120.

The preferred process of fabricating the present sensor comprises providing a (100) silicon wafer 20 having a surface 36 which receives a layer 29 of silicon nitride. Layer 29 is typically 4000 angstroms thick and is typically deposited by standard sputtering techniques in a low pressure gas discharge. Next, a uniform layer of permalloy, typically 80% nickel and 20% iron and 800 angstroms thick, is deposited on the silicon nitride by sputtering.

Using a suitable photo mask, a photoresist and a suitable etchant, permalloy elements such as 22, 24, 26 and 38 are delineated. A second layer 28 of silicon nitride, typically 4000 angstroms thick, is then sputter-deposited to provide complete coverage of the permalloy configuration and thus protect the resistive element from oxidation. Openings 82 are then etched through the nitride to the (100) silicon surface in order to delineate each member such as 32 and 34. The relative sizes of openings 82 are largely a matter of design choice. Dotted lines 114 represent the shape of depressions such as 30 under the ends of members such as 32 and 34.

Finally, anisotropic etchant that does not appreciably attack the silicon nitride is used to etch out the silicon in a controlled manner from beneath members such as 32 and 34 (KOH plus Isopropyl alcohol is a suitable etchant). The sloping sides of the etched depression such as 30 are bounded by (111) and other crystal surfaces that are resistive to the etchant. The depression bottom, a (100) surface which is much less resistant to the etchant, is located at a specified distance (e.g., 125 microns) from the members, typically by adjusting the duration of the etch. A doped silicon etch stop (e.g., a boron-doped layer) may also be used to control the depth of the depression, although such stops are not typically necessary when fabricating the present sensor. By adjusting the duration of the etch, the depth of depressions such as 30 can be controlled to a precision of about three microns or to about two percent. This precision results in a precise reproducibility of the thermal conductance of the air space surrounding the members and a correspondingly precise reproducibility of air flow response.

In order to obtain efficient undercutting of cantilever members and in order to undercut bridged members of the type shown in FIG. 3, the predetermined configuration of the member, e.g., typically a straight edge such as 110 (FIG. 4) or an axis of the member, is oriented at a non-zero angle 112 to the [110] axis of the silicon (while fabricating sensors such as the one disclosed will typically involve placing a straight member edge or an axis at an angle to the [110] silicon axis, it is conceivable that a member could be shaped such that no straight edges are involved or that no axis is easily defined, but that the configuration itself is still oriented to achieve the undercutting or to achieve in a minimum time, as further discussed below).

By making angle 112 substantially 45 degrees, the member will be undercut in a minimum amount of time. Further, using a non-zero orientation permits fabrication of two-ended bridges such as shown in FIG. 6. Such members are substantially impossible to make in a single processing step with an anisotropic etch and with the member edges oriented substantially with the [110] direction. This is because an anitropic etch will not appreciably undercut at the inside corners or at the (111) crystal planes exposed along the edges of a member if the edges of the members are oriented with the [110] direction. Further, if an isotropic etch is used to undercut the members, substantially less repeatability and precision is achieved, since such an etch does not discriminate between the various crystal planes.

Making angle 112 a 45 degree angle also permits rapid rounding and smoothing of the semiconductor and support interface with the member (see dashed lines 114 defining the ends of members 32 and 34), thus avoiding a stress connection point that otherwise occurs where two (111) planes intersect below dielectric layer 29.

In addition to making angle 112 substantially 45 degrees, it is preferred that the remaining edges of openings 82, i.e. those edges 111 and 113 not defining the edges of members 32 and 34, be oriented either substantially in line with the [110] direction (edges 111 in FIG. 4) or substantially normal to the [110] direction (edges 111 in FIG. 4) or substantially normal to the [110] direction (edges 113 in FIG. 4). If openings 82 are defined by the edges of members at a 45 degree angle to the [110] direction (i.e. by edges 110 and 110A for member 34 and by edges 110B and 110C for member 32), by edges 111 in line with the [110] direction, and by edges 113 normal to the [110] direction, there will be no undesirable undercutting below dielectric layer 29; i.e., the only undercutting that will then occur when forming depression 30 is undercutting below member 32 and 34, and depression 30 will be defined in size by openings 82 and the area below member 32 and 34. The slanted walls 115 of depression 30 are then formed by (111) planes, which are a natural etch stop to undercutting. The size of openings 82 is largely a matter of design choice.

FIG. 6 shows a region 116 for integration of circuitry, for example, portions of the circuitry illustrated in FIG. 9.

For the embodiments shown, typical dimensions of members such as 32 and 34 are 0.005 inch 0.007 inch wide, 0.010–0.020 inch long, and 0.8–1.2 microns thick. Typical permalloy elements such as elements 22, 24, 26 and 38 have a thickness of approximately 800 angstroms (typically in the range of approximately 800 angstroms to approximately 1600 angstroms) with a preferred composition of 80% nickel and 20% iron and a resistance value within the range of approximately 200 ohms to approximately 2000 ohms at room temperature, e.g., at approximtely 20–25 degrees centigrade (at permalloy element temperatures up to approximately 400 degrees centigrade resistance values increase by a factor of up to approximately 3). Line widths within permalloy grids may be approximately 5 microns with a 5 micron spacing. Depressions such as 30 typically have a 0.005 inch (125 micron) depth spacing between members such as 32 and 34 and the semiconductor body such as 20, but the spacing can easily vary in the range of approximately 0.001 inch to approximately 0.010 inch. A typical thickness of the semiconductor body or substrate such as 20 is 0.008 inch. (As previously indicated, dimensions provided are illustrative only and are not to be taken as limitations.)

Typical operating temperatures of heater elements such as 26 are in the range of approximately 100–200 degrees centigrade with approximately 160 degrees centigrade above ambient being the preferred operating temperature. Using the preferred permalloy element, this can be accomplished with only a few milliwatts of input power.

A heater resistance element having a 200–1000 ohm preferred resistance at 25 degrees centigrade provides the desired power dissipation to achieve the preferred operating temperature at a convenient voltage of a few volts and a convenient current of, for example, 2 to 5 milliamperes.

The present invention is to be limited only in accordance with the scope of the appended claims since persons skilled in the art may devise other embodiments still within the limits of the claims.

The embodiments of the invention in which an exclusive property or right is claimed are defined as follows:

1. An integral flow sensor and channel assembly comprising:
   a flow sensor having a sensing element integral to a semiconductor body;
   support means for supporting the flow sensor, the support means having a first surface;
   an enclosed flow channel comprising the first surface formed into a groove running below the sensing element, the flow channel comprising an inlet and an outlet for providing flow across the sensing element, the sensing element being located in the flow channel between the inlet and the outlet;
   the support means comprising means for flip-chip mounting the semiconductor body; and
   the semiconductor body being flip-chip mounted so that the sensing element is positioned over the groove in the support means.

2. The apparatus of claim 1 wherein the support means further comprises:
   circuitry for operating the sensor; and
   electrical connections for connecting the sensor and circuit;
   the flow channel, sensor, circuitry, and electrical connections all being integral to the support means.

3. The apparatus of claim 2 wherein the flow channel is configured to provide at the sensing element a substantially fully developed flow profile which is substantially independent of a flow profile entering the inlet.

4. The apparatus of claim 3 wherein the support means comprises means for orienting the flow sensor for a desired response to flow.

5. The apparatus of claim 4 wherein the means for orienting comprises the means for flip-chip mounting.

6. The apparatus of claim 5 wherein the support means comprises a printed circuit board.

7. The apparatus of claim 4 wherein the support means comprises a printed circuit board.

8. The apparatus of claim 3 wherein the support means comprises a printed circuit board.

9. The apparatus of claim 2 wherein the support means comprises a printed circuit board.

10. The apparatus of claim 1 wherein the support means comprises a printed circuit board.

11. The apparatus of claim 5 wherein the support means comprises a ceramic substrate.

12. The apparatus of claim 4 wherein the support means comprises a ceramic substrate.

13. The apparatus of claim 3 wherein the support means comprises a ceramic substrate.

14. The apparatus of claim 2 wherein the support means comprises a ceramic substrate.

15. The apparatus of claim 1 wherein the support means comprises a ceramic substrate.

16. The apparatus of claim 5 wherein the support means comprises a semiconductor substrate.

17. The apparatus of claim 4 wherein the support means comprises a semiconductor substrate.

18. The apparatus of claim 3 wherein the support means comprises a semiconductor substrate.

19. The apparatus of claim 2 wherein the support means comprises a semiconductor substrate.

20. The apparatus of claim 1 wherein the support means comprises a semiconductor substrate.

21. The apparatus of claim 2 wherein the support means comprises a means for orienting the flow sensor for a desired response to flow.

22. The apparatus of claim 1 wherein the support means comprises a means for orienting the flow sensor for a desired response to flow.

* * * * *